United States Patent
Gilboa et al.

(10) Patent No.: US 10,467,161 B2
(45) Date of Patent: Nov. 5, 2019

(54) DYNAMICALLY-TUNED INTERRUPT MODERATION

(71) Applicant: Mellanox Technologies, Ltd., Yokneam (IL)

(72) Inventors: Tal Gilboa, Megadim (IL); Gil Rockah, Kiryat Motzkin (IL); Achiad Shochat, Rosh Pina (IL); Amir Ancel, Moran (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 293 days.

(21) Appl. No.: 15/603,493

(22) Filed: May 24, 2017

(65) Prior Publication Data

US 2017/0344277 A1   Nov. 30, 2017

Related U.S. Application Data

(60) Provisional application No. 62/341,108, filed on May 25, 2016.

(51) Int. Cl.
G06F 3/06 (2006.01)
G06F 13/24 (2006.01)

(52) U.S. Cl.
CPC .................................. *G06F 13/24* (2013.01)

(58) Field of Classification Search
None
See application file for complete search history.

(56) References Cited

U.S. PATENT DOCUMENTS

| | | |
|---|---|---|
| 7,209,994 B1 | 4/2007 | Klaiber et al. |
| 7,222,203 B2 | 5/2007 | Madukkarumukumana et al. |
| 7,302,511 B2 | 11/2007 | Jeyasingh et al. |
| 8,180,944 B2 | 5/2012 | Serebrin et al. |
| 8,566,494 B2 | 10/2013 | Li et al. |
| 8,886,862 B2 | 11/2014 | Kagan |
| 8,949,498 B2 | 2/2015 | Kagan |
| 2006/0182039 A1 | 8/2006 | Jourdain et al. |
| 2008/0294825 A1 | 11/2008 | Mahalingam et al. |

(Continued)

OTHER PUBLICATIONS

Mellanox Technologies, "WinOF VPI for Windows", User Manual, 117 pages, Rev 4.40, Jul. 9, 2013.

(Continued)

*Primary Examiner* — Idriss N Alrobaye
*Assistant Examiner* — Dayton Lewis-Taylor
(74) *Attorney, Agent, or Firm* — Kligler & Associates

(57) ABSTRACT

Apparatus for communications includes a CPU, a system memory, and a network interface controller (NIC), which is configured to receive incoming data packets from a network, to post the received data packets in a designated queue for delivery to the CPU. The NIC issues interrupts to the CPU in response to the incoming data packets at a rate determined, for the designated queue, in accordance with an interrupt moderation parameter that is set for the queue. During each of a succession of monitoring periods, the CPU measures for the designated queue a current throughput of the incoming data packets and a current rate of interrupts, makes a comparison between the current measured throughput and rate of interrupts to the throughput and rate of interrupts that were measured during a preceding period in the succession, and selects and applies an update to the interrupt moderation parameter responsively to the comparison.

19 Claims, 3 Drawing Sheets

(56) References Cited

U.S. PATENT DOCUMENTS

| | | |
|---|---|---|
| 2010/0023666 A1 | 1/2010 | Mansell et al. |
| 2010/0070677 A1 | 3/2010 | Thakkar |
| 2010/0115514 A1 | 5/2010 | Maliszewski et al. |
| 2010/0174841 A1 | 7/2010 | Bogin et al. |
| 2010/0191885 A1 | 7/2010 | Serebrin et al. |
| 2010/0191887 A1 | 7/2010 | Serebrin et al. |
| 2010/0191888 A1 | 7/2010 | Serebrin et al. |
| 2010/0191889 A1 | 7/2010 | Serebrin et al. |
| 2010/0333101 A1 | 12/2010 | Pope et al. |
| 2011/0106993 A1 | 5/2011 | Arinobu et al. |
| 2011/0145459 A1 | 6/2011 | Conti et al. |
| 2011/0179417 A1 | 7/2011 | Inakoshi |
| 2012/0079175 A1 | 3/2012 | Flynn et al. |
| 2012/0179742 A1 | 7/2012 | Acharya et al. |
| 2013/0067193 A1 | 3/2013 | Kagan et al. |
| 2014/0006667 A1 | 1/2014 | Sun et al. |
| 2014/0040514 A1 | 2/2014 | Li et al. |
| 2015/0286594 A1 | 10/2015 | Degani |

OTHER PUBLICATIONS

Melllanox Technologies, "Linux/drivers/net/ethernet/mellanox/mlx4/en_cg.c", version 4.1, 4 pages, year 2007.

Mellanox Technologies, "Linux/drivers/net/ethernet/mellanox/mlx4/en_netdev.c", version 4.1., 41 pages, year 2007.

Intel Corporation, "Linux/drivers/net/ethernet/intel/ixgbe/ixgbe_main.c", 92 pages, version 4.1, years 1999-2014.

Intel Corporation, "Intel® Xeon® Processor E5-2600 v31 Product Family", Product brief, 5 pages, Aug. 21, 2014.

U.S. Appl. No. 14/664,988 Official Action dated Apr. 21, 2017.

U.S. Appl. No. 14/664,988 office action dated Aug. 28, 2017.

DYNAMICALLY-TUNED INTERRUPT MODERATION

CROSS-REFERENCE TO RELATED APPLICATIONS

This application claims the benefit of U.S. Provisional Patent Application 62/341,108, filed May 25, 2016, which is incorporated herein by reference.

FIELD OF THE INVENTION

The present invention relates generally to computer systems, and specifically to handling of interrupts generated by an input/output (I/O) device in a computer system.

BACKGROUND

In most computer systems today, the computer is connected to a packet network by a network interface controller (NIC). Upon receiving packets from the network, the NIC issues interrupts to the central processing unit (CPU) of the host computer, to inform the CPU that the packets have arrived and are awaiting service. In computers that handle a large volume of packet communication traffic, the resulting interrupts can place a significant burden on the CPU.

For this reason, many NICs use interrupt moderation in order to reduce the number of interrupts, and thus reduce the load they place on the CPU of the host computer to which they are attached. With interrupt moderation, the NIC hardware does not always generate an interrupt immediately after it receives a packet from the network. Rather, the hardware waits for more packets to arrive, or for a certain time-out to expire, before generating an interrupt. The NIC driver software generally allows the system operator to adjust the interrupt moderation parameters, such as the maximum number of packets and time-out interval between interrupts.

Some NICs offer adaptive interrupt moderation capabilities, which can adjust the interrupt rates dynamically depending on the traffic type and network usage. For example, U.S. Patent Application Publication 2014/0040514 describes a method for adaptive interrupt moderation in which a host device determines a number of connections between the host device and one or more link partners based, at least in part, on a connection identifier associated with each connection. The host device determines a new interrupt rate based at least in part on a number of connections, and updates an interrupt moderation timer with a value related to the new interrupt rate.

As another example, U.S. Patent Application Publication 2014/0006667 describes a method for adaptive hardware interrupt moderation in which the interrupt rate is adjusted based on traffic patterns. One mechanism used in this regard is to track and learn the traffic pattern in real time and dynamically tune various parameters through hardware. Dynamically-tuned parameters include a packet aggregation threshold and a push timer timeout value. Packet aggregation threshold techniques generally involve delaying interrupt generation until a predefined number of packets are received. Push timer timeout techniques generally involve forcing interrupt generation in low packet throughout scenarios if the received number of packets does not cross a threshold in a certain amount of time. One embodiment reduces packet delivery latency in the low packet rate case, while maximizing aggregation count in the high packet rate case.

U.S. Pat. No. 8,566,494 describes an apparatus that performs traffic class-based adaptive interrupt moderation. The apparatus comprises two or more interrupt vectors, and moderation timers associated with the interrupt vectors are set with different interrupt rates. An interrupt vector logic unit sends an interrupt vector if there is an interrupt event from a queue associated with a moderation timer and the moderation timer expires.

U.S. Patent Application Publication 2015/0286594, whose disclosure is incorporated herein by reference, describes a method for communications in which a NIC of a host computer receives incoming data packets from a network on multiple active rings. An average throughput rate of the incoming data packets is measured over the active rings. For each ring among a plurality of the active rings, a respective throughput rate of the incoming data packets on the ring is measured, and a respective interrupt moderation parameter of the ring is set responsively to a comparison of the respective throughput rate on the ring to the average throughput rate. Interrupts are issued from the NIC to a central processing unit (CPU) of the host computer in response to the incoming data packets on the ring at a rate determined in accordance with the respective interrupt moderation parameter.

SUMMARY

Embodiments of the present invention that are described hereinbelow provide methods and software for adaptive interrupt moderation, as well as apparatus implementing such methods.

There is therefore provided, in accordance with an embodiment of the invention, apparatus for communications, including a central processing unit (CPU), a system memory, and a network interface controller (NIC), which is configured to receive incoming data packets from a network, to post the received data packets in a designated queue for delivery to the CPU. The NIC is configured to issue interrupts to the CPU in response to the incoming data packets at a rate determined, for the designated queue, in accordance with an interrupt moderation parameter that is set for the queue. The CPU is configured, during each period in a succession of monitoring periods, to measure for the designated queue a current throughput of the incoming data packets and a current rate of interrupts during the period, to make a comparison between the current measured throughput and rate of interrupts to the throughput and rate of interrupts that were measured during a preceding period in the succession, and to select and apply an update to the interrupt moderation parameter responsively to the comparison.

In some embodiments, the update is selected depending upon whether the comparison indicates that a previous update was followed by an improvement or a degradation in the throughput and the rate of interrupts relative to the preceding period. Typically, the improvement is considered to have occurred when the current throughput is greater than the throughput measured during the preceding period, while the degradation is considered to have occurred when the current throughput is less than the throughput measured during the preceding period. Additionally or alternatively, when the current throughput is equal to the throughput measured during the preceding period, the improvement is considered to have occurred when the current rate of interrupts is less than the rate of interrupts measured during the preceding period, while the degradation is considered to have occurred when the current rate of interrupts is greater than the rate of interrupts measured during the preceding period.

In some embodiments, each update includes an increment or decrement of the interrupt moderation parameter, and the CPU is configured to select the update so as to repeat the increment or decrement of the previous update when the comparison indicates that the previous update was followed by the improvement and to reverse the increment or decrement of the previous update when the comparison indicates that the previous update was followed by the degradation. In a disclosed embodiment, the CPU is configured to leave the interrupt moderation parameter unchanged when the throughput and the rate of interrupts did not change relative to the preceding period. Additionally or alternatively, the CPU is configured to increase a duration of a subsequent monitoring period in the succession when the throughput and the rate of interrupts did not change relative to the preceding period.

In the disclosed embodiments, the interrupt moderation parameter includes at least one parameter selected from a set of parameters consisting of an interrupt timeout setting and a packet count. Typically, the NIC is configured to receive the incoming data packets on a plurality of different queues, and the CPU is configured to set respective interrupt moderation parameters individually for the queues responsively to the throughput and rate of interrupts that are measured respectively for each of the queues.

There is also provided, in accordance with an embodiment of the invention, a method for communications, which includes receiving in a network interface controller (NIC) of a host computer incoming data packets from a network and posting the received data packets in a designated queue for delivery to a CPU. Interrupts are issued to the CPU in response to the incoming data packets at a rate determined, for the designated queue, in accordance with an interrupt moderation parameter that is set for the queue. During each period in a succession of monitoring periods, a current throughput of the incoming data packets and a current rate of interrupts during the period are measured for the designated queue. A comparison is made between the current measured throughput and rate of interrupts to the throughput and rate of interrupts that were measured during a preceding period in the succession. An update to the interrupt moderation parameter is selected and applied responsively to the comparison.

There is additionally provided, in accordance with an embodiment of the invention, a computer software product, including a non-transitory computer-readable medium in which program instructions are stored for execution on a computer that includes a CPU and a network interface controller (NIC), which is configured to receive incoming data packets from a network, to post the received data packets in a designated queue for delivery to the CPU, and to issue interrupts to the CPU in response to the incoming data packets at a rate determined, for the designated queue, in accordance with an interrupt moderation parameter that is set for the queue. The instructions, when read by the computer, cause the computer to measure for the designated queue, during each period in a succession of monitoring periods, a current throughput of the incoming data packets and a current rate of interrupts during the period, to make a comparison between the current measured throughput and rate of interrupts to the throughput and rate of interrupts that were measured during a preceding period in the succession, and to select and apply an update to the interrupt moderation parameter responsively to the comparison.

The present invention will be more fully understood from the following detailed description of the embodiments thereof, taken together with the drawings in which:

DETAILED DESCRIPTION OF EMBODIMENTS

Figure 1:
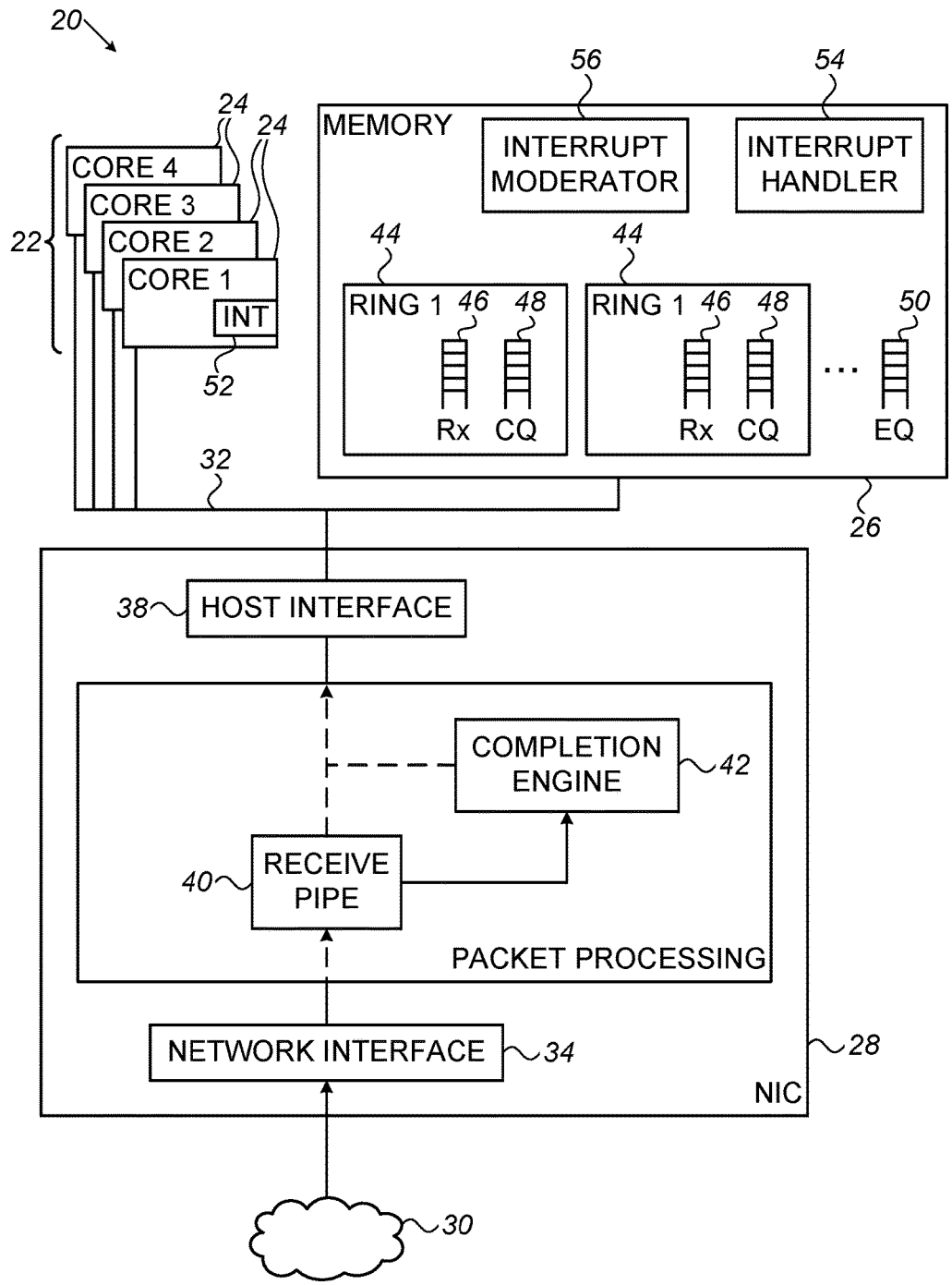
FIG. 1 is a block diagram that schematically illustrates a computer system, in accordance with an embodiment of the invention.

Adaptive techniques for interrupt moderation that are known in the art generally depend on analyzing patterns of incoming data traffic, and then choosing among a set of predefined profiles in order to determine the interrupt moderation parameters that will be suit the current traffic pattern. This approach limits the flexibility of the receiving node in accommodating dynamic changes in the incoming traffic and in the availability of resources of the receiving node to process the incoming traffic. When the NIC maintains multiple queues for incoming traffic from different sources, the changes in the incoming traffic and resource availability may have different effects on different queues.

Embodiments of the present invention that are described herein address these problems by providing techniques for dynamic interrupt moderation that search continually for the optimal interrupt moderation parameters for each queue, without necessarily imposing any sort of predefined profile. The disclosed techniques drive the interrupt moderation parameters toward values that will maximize packet throughput (i.e., maximizing the number of packets or volume of data delivered to the CPU) at the lowest possible interrupt rate. The interrupt moderation parameters are updated dynamically when changes occur in the incoming traffic or resource availability.

In the embodiments that are described hereinbelow, a network interface controller (NIC) receives incoming data packets from a network and posts the received packets in designated queues in a system memory for delivery to a central processing unit (CPU). The NIC issues interrupts to the CPU in response to the incoming data packets at a rate determined, for each queue, in accordance with one or more interrupt moderation parameters that are set for that queue. During each of a succession of monitoring periods, a processor measures, for each queue, the current throughput of the incoming data packets and the current rate of interrupts during the period. The processor compares the current measured throughput and rate of interrupts to the throughput and rate of interrupts that were measured during the preceding period in the succession, and updates the interrupt moderation parameters based on the comparison. These monitoring and updating functions can be performed, for example, by a software process running on the CPU or, alternatively, by a dedicated processor, such as processing circuits embedded in the NIC.

In the disclosed embodiments, the processor selects the update depending upon whether the comparison between the current and preceding throughput and rate of interrupts indicates that the previous update (made before the current monitoring period) was followed by an improvement or a degradation in the throughput and the rate of interrupts for this queue relative to the preceding period. In some embodiments, an improvement is considered to have occurred when the current throughput is greater than the throughput measured during the preceding period, while a degradation is considered to have occurred when the current throughput is less than the throughput measured during the preceding period. When the current throughput is equal to the preceding throughput, an improvement may still be considered to have occurred when the current rate of interrupts is less than the rate of interrupts measured during the preceding period, while a degradation is considered to have occurred when the current rate of interrupts is greater than the preceding rate of interrupts.

The update to the interrupt moderation parameters for any given queue typically comprises an increment or decrement of one or more parameters for the given queue, such as the interrupt timeout value and/or the packet count required to trigger an interrupt (which may differ from queue to queue, as noted above). The processor selects the current update so as to repeat the increment or decrement of the previous update when the current comparison of throughput and rate of interrupts indicates that the previous update was followed by an improvement in performance, or to reverse the increment or decrement of the previous update when the comparison indicates that the previous update was followed by a degradation in performance. On the other hand, when the throughput and the rate of interrupts did not change relative to the preceding period, the processor will leave the interrupt moderation parameters unchanged and may also increase the duration of one or more subsequent monitoring periods in the succession in order to reduce fluctuations and possible errors during periods of stable traffic.

FIG. 1 is a block diagram, which schematically illustrates a computer system 20, in accordance with an embodiment of the invention. System 20 is presented as an example of an operating environment in which the present techniques of interrupt moderation may be applied. The principles of the present invention, however, may similarly be implemented, mutatis mutandis, in other computer systems that receive data packets or other high-speed I/O traffic on one or more channels, and all such implementations are considered to be within the scope of the present invention.

Computer system 20 comprises a CPU 22, which typically (although not necessarily) comprises multiple processing cores 24, and uses a system memory 26, comprising random-access memory (RAM), to store program instructions and data. System 20 is connected to a high-speed packet network 30, such as an InfiniBand or Ethernet switch fabric, by a NIC 28, which communicates with CPU 22 and memory 26 via a peripheral component bus 32, such as a PCI Express® bus.

NIC 28 supports concurrent communications on multiple rings 44 between network 30 and processes running on CPU 22. Although for the sake of simplicity, only two rings are shown in FIG. 1, in practice, the number of rings is typically equal at least to the number of cores 24 and may be much larger. Each ring 44 represents a transport channel, which typically comprises a receive queue 46 for incoming packets, along with a completion queue (CQ) 48, as well as a transmit queue (omitted from the figure for the sake of simplicity). In an InfiniBand environment, for example, the transmit and receive queues are referred to as a work queue pair (QP), whereas Ethernet and other protocols may use other names for these sorts of constructs. Typically, queues 46, 48, . . . , are maintained in system memory 26, where they can be accessed both by CPU 22 and NIC 28, but alternatively, a separate, dedicated memory may be used for this purpose.

Although only receive queues 46 are shown in FIG. 1, NIC 28 may also generate interrupts with respect to transmission of outgoing packets from send queues. In this case, interrupt moderation may be applied (possibly with different parameter values) both for transmitted packets and for received packets. The description that follows will relate, for the sake of simplicity and clarity, to interrupt moderation with respect to received packets and is applicable regardless of whether rings 44 comprise both transmit and receive queues or only receive queues. The principles of the disclosed embodiments may similarly be applied, mutatis mutandis, to transmission by NIC 28 from send queues.

NIC 28 comprises a network interface 34, which connects to network 30, and a host interface 38, which connects to bus 32. Packet processing circuitry 36, coupled between network interface 34 and host interface 38, comprises a receive pipe 40, which parses the headers of incoming packets and writes the packets (or at least the packet payload data) to appropriate buffers in memory 26. Typically, packet processing circuitry 36 also comprises a transmit pipe and other processing and forwarding components, which will be apparent to those skilled in the art and are omitted from the present description and drawings for the sake of simplicity.

After receive pipe 40 has received a message (which comprises one or more incoming packets from network 30) and written the message data to memory 26, a completion engine 42 in packet processing circuitry 36 posts a completion report to CQ 48. (Posting the completion report to CQ 48, while writing the corresponding packet payload to the appropriate buffer, is one way of "posting the packet" to the designated queue, although packets may alternatively be posted to their respective queues using other packet queuing and forwarding techniques that are known in the art.) In general, in the absence of interrupt moderation, completion engine 42 will write an event to an event queue 50 and will issue an interrupt to an interrupt register 52 in the appropriate core 24 for each completion report that it writes to CQ 48 on each ring 44. The interrupt causes core 24 to suspend other processes and call an interrupt handler 54 to read and service the event.

In system 20, however, the rate of interrupts is reduced for at least some of the rings by an interrupt moderation function 56. This function sets interrupt moderation parameters for each ring, such as the timeout period between interrupts and/or the packet count required to issue an interrupt. The packet count (or equivalently, the completion count) parameter indicates, for each ring, the threshold number of packets (or completions) that have to be aggregated before an interrupt is issued to CPU 22. The timeout parameter indicates that from the time a packet (or completion) is received, NIC 28 will issue an interrupt when the timeout expires even if the aggregated packet or completion count has not yet reached the threshold. Interrupt moderation function 56 may control other traffic-related parameters of rings 44, as well, such as buffer parameters.

Interrupt moderation function 56 is typically implemented in cooperation between software running on CPU 22 and hardware logic in NIC 28. The software component of function 56 may be integrated with or operate in conjunction with NIC driver software. This interrupt moderation software may be downloaded to computer 20 in electronic form, over a network, for example. Additionally or alternatively, the software may be provided to and/or stored in computer system 20 on tangible, non-transitory computer-readable media, such as optical, magnetic, or electronic memory media. Further alternatively, interrupt moderation function 56 may be implemented entirely in hardware logic and/or firmware on an embedded processor within NIC 28 or a separate control unit.

Figure 2:
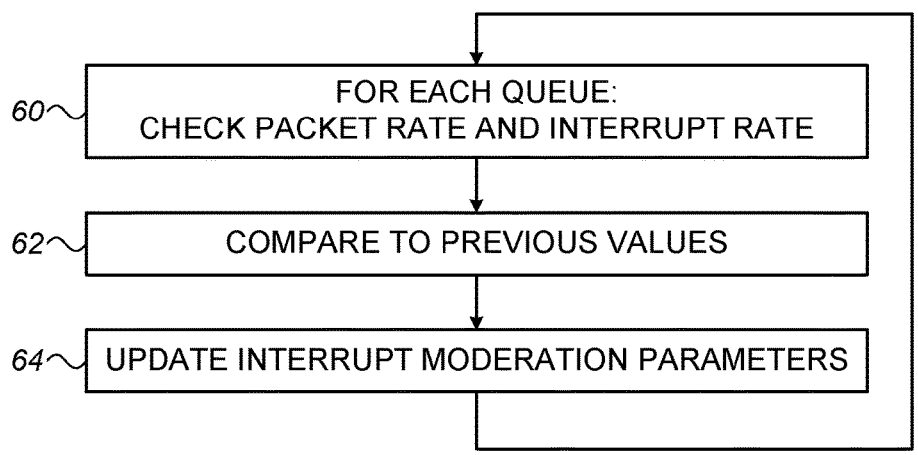
FIG. 2 is a flow chart that schematically illustrates a method for adaptive interrupt moderation, in accordance with an embodiment of the invention.

FIG. 2 is a flow chart that schematically illustrates a method for adaptive interrupt moderation, in accordance with an embodiment of the invention. The method is carried out by interrupt moderation function 56 periodically over one or more of rings 44, or possibly over all of the rings. The monitoring periods over which the method is carried out may be set to a certain time interval (for example, every 100 ms), or they may be set to contain a certain number of events (for example, starting a new period every sixty-four interrupts). Although FIG. 2 shows how interrupt moderation function 56 monitors and updates parameters for a single ring (i.e., a single CQ 48), this same method can be implemented in parallel over multiple queues concurrently.

During each period, interrupt moderation function 56 monitors the throughput (i.e., the number or rate) of incoming packets delivered to CPU 22 by NIC 28 and the rate of interrupts raised by NIC 28 during the period, at a sampling step 60. Interrupt moderation function 56 then compares the current measured throughput and rate of interrupts to the throughput and rate of interrupts that were measured during the preceding monitoring period, at a comparison step 62. Interrupt moderation performance is considered to have improved relative to the preceding period if the current throughput is greater than the throughput measured during the preceding period, and to have degraded when the current throughput is less than the throughput measured during the preceding period. If the current throughput is equal to the throughput measured during the preceding period, performance is still considered to have improved if the current rate of interrupts is less than the rate of interrupts measured during the preceding period, and to have degraded when the current rate of interrupts is greater than the preceding rate.

Depending on the results of the comparison made at step 62, interrupt moderation function 56 updates the interrupt moderation parameters of each ring (or queue), for example by writing the updated parameter values to corresponding registers in NIC 28, at a parameter update step 64. As noted earlier, the update typically involves incrementing or decrementing the packet count parameter and/or incrementing or decrementing the timeout parameter. The choice of which parameters to update may depend on whether NIC 28 supports interrupt moderation at the interrupt level only (so that only the timeout parameter is adjustable) or at the completion level (in which case the packet count parameter can also be adjusted). Typically, the system operator initially sets the timeout and packet count parameters to default values, and interrupt moderation function 56 will then increment and decrement the parameters dynamically and automatically, using the method of FIG. 2, in order to find the parameters that give optimal performance.

Figure 3:
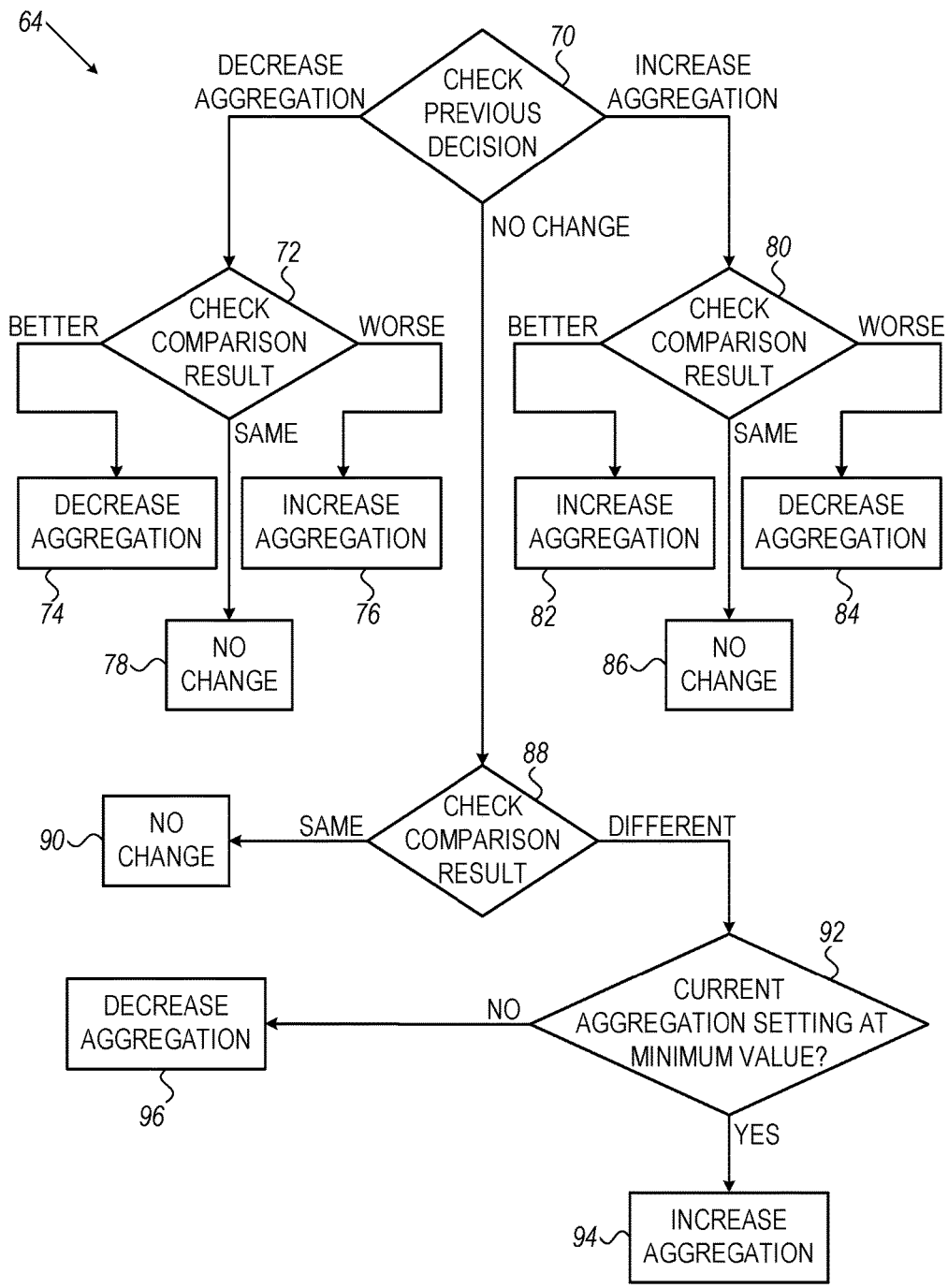
FIG. 3 is a flow chart that schematically shows details of a method for tuning interrupt moderation parameters, in accordance with an embodiment of the invention.

FIG. 3 is a flow chart that schematically shows details of parameter update step 64, in accordance with an embodiment of the invention. The decision made at step 64 depends on both the results of the performance comparison made at step 62 and the decision made and implemented in the previous update: Interrupt moderation function 56 will select the current update so as to repeat the direction of the previous update when the comparison indicates that the previous update was followed by an improvement in performance, as defined above, and to reverse the direction of the previous update when the comparison indicates that the previous update was followed by a degradation in performance. Furthermore, when the throughput and the rate of interrupts did not change relative to the preceding period, the decision tree illustrated in FIG. 3 will cause NIC 28 to "park" the interrupt moderation parameters at their previous values, at least until there is a change in packet traffic or other loads on system 20 that change the level of performance monitored at step 60.

In the context of FIG. 3, when the direction of the change in interrupt moderation parameters is to "decrease aggregation," it will cause NIC 28 to reduce the number of packets or completions that are aggregated before generating an interrupt (and consequently to tend to issue a greater number of interrupts). When the direction is to "increase aggregation," to the NIC will aggregate more packets or completions and will thus tend to reduce the number of interrupts. Thus, decrementing the timeout value or packet count that is necessary to trigger an interrupt decreases aggregation, while incrementing the timeout value or packet count increases aggregation. At each iteration through step 64, interrupt moderation function 56 increases or decreases the aggregation to be applied by NIC 28, or may park the interrupt moderation parameters when no change in performance has occurred since the previous monitoring period. In this latter case, interrupt moderation function 56 may also increase the duration of the period that will be allowed to elapse at the next pass through step 60 before repeating the comparison and update decisions at steps 62 and 64.

Turning now to the details of step 64, as shown in FIG. 3, interrupt moderation function 56 begins the decision process by checking the decision made in regard to the present queue at the previous pass through step 64, at a decision checking step. As explained above, the decision may have been either to decrease or increase aggregation, or "park," i.e., make no change in the interrupt moderation parameters.

Taking first the case that the previous decision was to decrease aggregation, interrupt moderation function 56 checks the result of the latest performance comparison made in step 62, at a comparison checking step 72. If the performance was better in the current period relative to the preceding period (meaning, as explained above, that the packet throughput increased or, if packet throughput was unchanged, that the interrupt rate decreased compared to the preceding period), interrupt moderation function 56 will decrease aggregation further, at an aggregation decreasing step 74. For example, at step 74, interrupt moderation function 56 decrements the value of either the timeout parameter or the packet count parameter, or both. On the other hand, if performance was worse in the current period than in the preceding period, interrupt moderation function 56 increases aggregation, at an aggregation increasing step 76, reversing the previous decrease. Otherwise, when performance has not changed, interrupt moderation function 56 makes no change in the interrupt moderation parameters, at a parking step 78.

When the previous decision checked at step 70 was to increase aggregation, interrupt moderation function 56 again checks the result of the latest performance comparison made in step 62, at a comparison checking step 80. In this case, if performance improved in the current period relative to the preceding period, interrupt moderation function 56 will increase aggregation further, at an aggregation increasing step 82. Otherwise, if performance degraded, interrupt moderation function 56 will decrease aggregation, at an aggregation decreasing step 84, or will leave the interrupt moderation parameters unchanged, at a parking step 86, if the performance was unchanged.

When the previous decision checked at step 70 was to park the interrupt moderation parameters at their previous values, interrupt moderation function 56 still check the result of the latest performance comparison, at a comparison checking step 88. If the performance in the current monitoring period was again unchanged relative to the previous monitoring period, interrupt moderation function 56 will again leave the interrupt moderation parameters unchanged, at a repeat parking step 90. On the other hand, if performance has changed (for better or worse), interrupt moderation function 56 checks whether the interrupt moderation parameters for this queue are already set to their minimal values, at a parameter checking step 92. If so, interrupt moderation function 56 increases aggregation, for example by incrementing either or both of the timeout and packet count parameters, at an aggregation increasing step 94. Otherwise, interrupt moderation function 56 decreases aggregation, at an aggregation decreasing step 96.

Following the above decisions, interrupt moderation function 56 returns to step 60 (FIG. 2) for the next iteration.

Although the embodiments described above refer specifically to a NIC and interaction between the NIC and a CPU, the principles of the present invention may similarly be applied in other I/O devices that service multiple channels and issue interrupts to the CPU. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Apparatus for communications, comprising:
a central processing unit (CPU);
a system memory; and
a network interface controller (NIC), which is configured to receive incoming data packets from a network, to post the received data packets in a designated queue for delivery to the CPU, and to issue interrupts to the CPU in response to the incoming data packets at a rate determined, for the designated queue, in accordance with an interrupt moderation parameter that is set for the queue,
wherein the CPU is configured, during each period in a succession of monitoring periods, to measure for the designated queue a current throughput of the incoming data packets and a current rate of interrupts during the period, to make a first comparison between the current measured throughput and the throughput measured during a preceding period in the succession and a second comparison between the current rate of interrupts and the rate of interrupts measured during the preceding period in the succession, and to select and apply an update to the interrupt moderation parameter responsively to the first and second comparisons.

2. The apparatus according to claim 1, wherein the update is selected depending upon whether the first and second comparisons indicate that a previous update was followed by an improvement or a degradation in the throughput and the rate of interrupts relative to the preceding period.

3. The apparatus according to claim 2, wherein the improvement is considered to have occurred when the current throughput is greater than the throughput measured during the preceding period, while the degradation is considered to have occurred when the current throughput is less than the throughput measured during the preceding period.

4. The apparatus according to claim 3, wherein when the current throughput is equal to the throughput measured during the preceding period, the improvement is considered to have occurred when the current rate of interrupts is less than the rate of interrupts measured during the preceding period, while the degradation is considered to have occurred when the current rate of interrupts is greater than the rate of interrupts measured during the preceding period.

5. The apparatus according to claim 2, wherein each update comprises an increment or decrement of the interrupt moderation parameter, and wherein the CPU is configured to select the update so as to repeat the increment or decrement of the previous update when the first and second comparisons indicate that the previous update was followed by the improvement and to reverse the increment or decrement of the previous update when the first and second comparisons indicate that the previous update was followed by the degradation.

6. The apparatus according to claim 5, wherein the CPU is configured to leave the interrupt moderation parameter unchanged when the throughput and the rate of interrupts did not change relative to the preceding period.

7. The apparatus according to claim 5, wherein the CPU is configured to increase a duration of a subsequent monitoring period in the succession when the throughput and the rate of interrupts did not change relative to the preceding period.

8. The apparatus according to claim 1, wherein the interrupt moderation parameter comprises at least one parameter selected from a set of parameters consisting of an interrupt timeout setting and a packet count.

9. The apparatus according to claim 1, wherein the NIC is configured to receive the incoming data packets on a plurality of different queues, and wherein the CPU is configured to set respective interrupt moderation parameters individually for the queues responsively to the throughput and rate of interrupts that are measured respectively for each of the queues.

10. A method for communications, comprising:
receiving in a network interface controller (NIC) of a host computer incoming data packets from a network;
posting the received data packets in a designated queue for delivery to a CPU;
issuing interrupts to the CPU in response to the incoming data packets at a rate determined, for the designated queue, in accordance with an interrupt moderation parameter that is set for the queue;
during each period in a succession of monitoring periods, measuring for the designated queue a current throughput of the incoming data packets and a current rate of interrupts during the period;
making a first comparison between the current measured throughput and the throughput measured during a preceding period in the succession and a second comparison between the current rate of interrupts and the rate of interrupts measured during the preceding period in the succession; and
selecting and applying an update to the interrupt moderation parameter responsively to the first and second comparisons.

11. The method according to claim 10, wherein the update is selected depending upon whether the first and second comparisons indicate that a previous update was followed by an improvement or a degradation in the throughput and the rate of interrupts relative to the preceding period.

12. The method according to claim 11, wherein the improvement is considered to have occurred when the current throughput is greater than the throughput measured during the preceding period, while the degradation is considered to have occurred when the current throughput is less than the throughput measured during the preceding period.

13. The method according to claim 12, wherein when the current throughput is equal to the throughput measured during the preceding period, the improvement is considered to have occurred when the current rate of interrupts is less than the rate of interrupts measured during the preceding period, while the degradation is considered to have occurred when the current rate of interrupts is greater than the rate of interrupts measured during the preceding period.

14. The method according to claim 11, wherein each update comprises an increment or decrement of the interrupt moderation parameter, and wherein selecting the update comprises repeating the increment or decrement of the previous update when the first and second comparisons indicate that the previous update was followed by the improvement and reversing the increment or decrement of the previous update when the first and second comparisons indicate that the previous update was followed by the degradation.

15. The method according to claim 14, wherein selecting the update comprises leaving the interrupt moderation parameter unchanged when the throughput and the rate of interrupts did not change relative to the preceding period.

16. The method according to claim 14, and comprising increasing a duration of a subsequent monitoring period in the succession when the throughput and the rate of interrupts did not change relative to the preceding period.

17. The method according to claim 10, wherein the interrupt moderation parameter comprises at least one parameter selected from a set of parameters consisting of an interrupt timeout setting and a packet count.

18. The method according to claim 10, wherein the NIC is configured to receive the incoming data packets on a plurality of different queues, and wherein the method comprises setting respective interrupt moderation parameters individually for the queues responsively to the throughput and rate of interrupts that are measured respectively for each of the queues.

19. A computer software product, comprising a non-transitory computer-readable medium in which program instructions are stored for execution on a computer that includes a CPU and a network interface controller (NIC), which is configured to receive incoming data packets from a network, to post the received data packets in a designated queue for delivery to the CPU, and to issue interrupts to the CPU in response to the incoming data packets at a rate determined, for the designated queue, in accordance with an interrupt moderation parameter that is set for the queue, wherein the instructions, when read by the computer, cause the computer to measure for the designated queue, during each period in a succession of monitoring periods, a current throughput of the incoming data packets and a current rate of interrupts during the period, to make a first comparison between the current measured throughput and the throughput measured during a preceding period in the succession and a second comparison between the current rate of interrupts and the rate of interrupts measured during the preceding period in the succession, and to select and apply an update to the interrupt moderation parameter responsively to the first and second comparisons.

\* \* \* \* \*